(12) United States Patent
Date

(10) Patent No.: US 8,679,643 B2
(45) Date of Patent: *Mar. 25, 2014

(54) PLATED STEEL SHEET FOR CANS AND PRODUCTION METHOD THEREOF

(75) Inventor: Hiromitsu Date, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 632 days.

This patent is subject to a terminal disclaimer.

(21) Appl. No.: 12/450,645

(22) PCT Filed: Apr. 4, 2008

(86) PCT No.: PCT/JP2008/057123
§ 371 (c)(1),
(2), (4) Date: Oct. 1, 2009

(87) PCT Pub. No.: WO2008/123632
PCT Pub. Date: Oct. 16, 2008

(65) Prior Publication Data
US 2010/0119867 A1     May 13, 2010

(30) Foreign Application Priority Data
Apr. 4, 2007     (JP) .................. 2007-098409

(51) Int. Cl.
C23C 28/00 (2006.01)
C23C 22/58 (2006.01)
C25D 5/26 (2006.01)
C25D 9/08 (2006.01)
C25D 11/36 (2006.01)

(52) U.S. Cl.
USPC ............ 428/643; 428/646; 428/648; 428/633

(58) Field of Classification Search
None
See application file for complete search history.

(56) References Cited

U.S. PATENT DOCUMENTS

| | | | |
|---|---|---|---|
| 4,601,957 A | 7/1986 | Fujimoto et al. | |
| 2005/0153157 A1 | 7/2005 | Matsubayashi et al. | |

FOREIGN PATENT DOCUMENTS

| | | |
|---|---|---|
| EP | 1243668 | 9/2002 |
| EP | 1270764 | 1/2003 |
| JP | 52-68832 | 6/1977 |
| JP | 52-75626 | 6/1977 |
| JP | 52-92837 | 8/1977 |
| JP | 59-47396 | 3/1984 |
| JP | 2001-316851 | 11/2001 |

(Continued)

OTHER PUBLICATIONS

Date et al., English Machine Translation of JP 2007239004 A.*

(Continued)

Primary Examiner — Gwendolyn Blackwell
Assistant Examiner — Lucas Wang
(74) Attorney, Agent, or Firm — Kenyon & Kenyon LLP

(57) ABSTRACT

A plated steel sheet for cans with excellent secondary adhesion of an organic film and high corrosion resistance is provided, that is, a plated steel sheet for cans, which is a plated steel sheet having a alloy tin layer and a metallic tin layer in sequence from the steel sheet side, wherein a chemical conversion layer comprising tin oxide in an amount of 0.3 to 5.0 mC/cm$^2$ in terms of electricity necessary for reduction and tin phosphate in an amount of 0.5 to 5.0 mg/m$^2$ in terms of P is provided on the metallic tin layer and zirconium(IV) oxide in an amount of 0.2 to 5 mg/m$^2$ in terms of Zr is provided on the chemical conversion layer. A production method thereof is also provided.

10 Claims, 1 Drawing Sheet

(56) References Cited

FOREIGN PATENT DOCUMENTS

| | | |
|---|---|---|
| JP | 2002-206191 | 7/2002 |
| JP | 2002-275643 | 9/2002 |
| JP | 2002-275657 | 9/2002 |
| JP | 2002-285354 | 10/2002 |
| JP | 2002-339081 | 11/2002 |
| JP | 2003-3281 | 1/2003 |
| JP | 2003-082497 | 3/2003 |
| JP | 2003-175564 | 6/2003 |
| JP | 2003-183853 | 7/2003 |
| JP | 2003-239084 | 8/2003 |
| JP | 2003-253466 | 9/2003 |
| JP | 2004-68603 | 3/2004 |
| JP | 2005-097712 | 4/2005 |
| JP | 2005-325402 | 11/2005 |
| JP | 2007131882 A * | 5/2007 |
| JP | 2007239004 A * | 9/2007 |

OTHER PUBLICATIONS

Hamahara et al., English Machine Translation of JP 2007131882 A.*

International Search Report dated May 27, 2008 issued in corresponding PCT Application No. PCT/JP2008/057123.

* cited by examiner

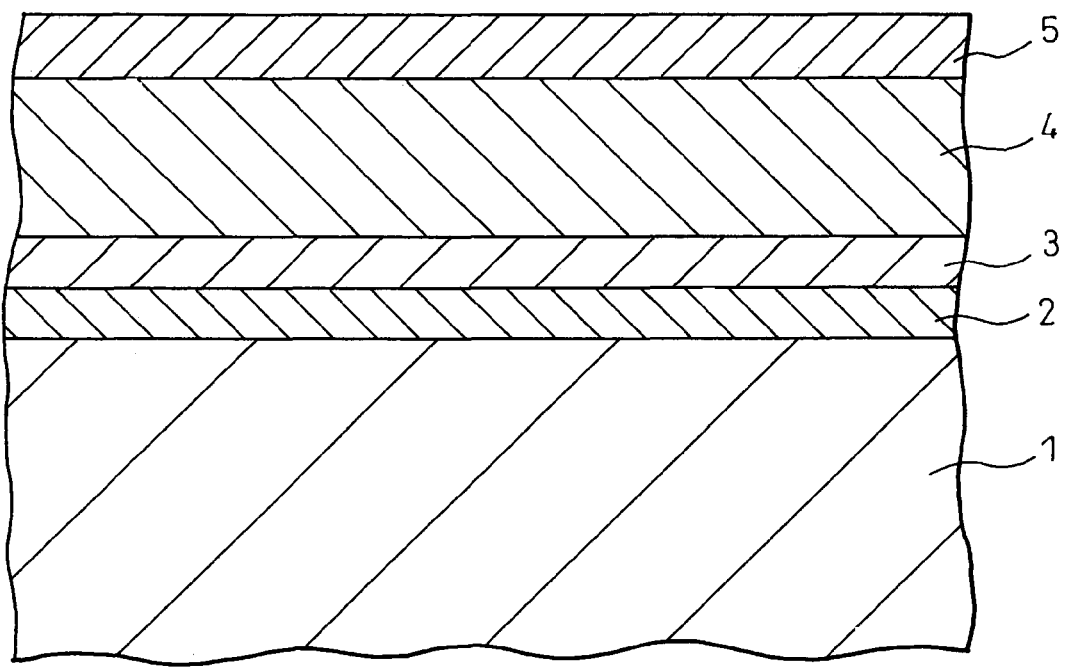

PLATED STEEL SHEET FOR CANS AND PRODUCTION METHOD THEREOF

CROSS-REFERENCE TO RELATED APPLICATIONS

This application is based upon and claims the benefit of priority from Japanese Patent Application No. 2007-98409, filed Apr. 4, 2007, the entire contents of which are incorporated herein by reference.

TECHNICAL FIELD

The present invention relates to a plated steel sheet for cans, which is used for a beverage can, a food can and the like and is excellent in the secondary adhesion of an organic film and the corrosion resistance, and a production method thereof.

BACKGROUND ART

The surface-treated steel sheet conventionally used as a can material is predominately a tin-plated steel sheet such as tinplate, LTS and TNS, a nickel-plated steel sheet (TFS-NT), or a electrolytically chromium-plated steel sheet (TFS-CT). Usually, a chemical conversion treatment is applied to the plated surface of such a steel sheet and the adhesion to a lacquer or a resin film is thereby secured.

The chemical conversion treatment of currently commercialized surface-treated steel sheets for cans is in most cases a dip treatment or cathodic electrolysis treatment using an aqueous solution mainly comprising bichromate or chromic acid. By way of exception, there is known a cathodic and anodic electrolysis treatment of tinplate in an aqueous phosphate solution disclosed in Japanese Unexamined Patent Publication (Kokai) Nos. 52-68832 and 52-75626, but the application thereof is limited to a milk powder can used with its inner surface remaining uncoated. The main reason why this cathodic and anodic electrolysis treatment is not applied to a beverage can or a food can except for a milk powder can is because the adhesion of a lacquer or an organic film such as resin film is insufficient.

On the other hand, a chromium(III) oxide film obtained by a dip treatment or cathodic electrolysis treatment using an aqueous solution mainly comprising bichromate or chromic acid has a great effect of enhancing the adhesion of an organic film, and although various treatments as an alternative to this chemical conversion treatment are being studied, these are not put into practice at present. For example, Japanese Unexamined Patent Publication (Kokai) No. 59-47396 discloses an electrolytic tinplate for DI cans, on which a phosphoric acid-based film is formed by a dip treatment, and Japanese Unexamined Patent Publication (Kokai) No. 52-92837 discloses a method of performing an anodic treatment in a phytic acid or phytate solution.

In recent years, many techniques of applying a film to a tin plating layer by using a silane coupling agent are disclosed. For example, Japanese Unexamined Patent Publication (Kokai) No. 2002-285354 discloses a steel sheet and a can, where a silane coupling agent coating layer is provided on an Sn layer or Fe—Sn alloy layer of a tin-plated steel sheet, and Japanese Unexamined Patent Publication (Kokai) No. 2001-316851 discloses a tin-plated steel sheet where on a tin plating layer, a chemical conversion film containing P and Sn is formed as a lower layer and a silane coupling layer is formed as an upper layer. Furthermore, techniques similar to Japanese Unexamined Patent Publication (Kokai) No. 2001-316851 are disclosed in Japanese Unexamined Patent Publication (Kokai) Nos. 2002-275643, 2002-206191, 2002-275657, 2002-339081, 2003-3281, 2003-175564, 2003-183853, 2003-239084, 2003-253466 and 2004-68063.

DISCLOSURE OF THE INVENTION

However, the chemical conversion films described in these patent publications all are far from provided with performances necessary in use as a plated steel sheet for cans, such as secondary adhesion of an organic film and corrosion resistance.

Accordingly, an object of the present invention is to solve the above-described problems in conventional techniques and provide a plated steel sheet excellent in the secondary adhesion of an organic film and the corrosion resistance and a production method thereof.

The present inventors have made intensive studies on those problems and formulated a layer structure enabling a tin-plated steel sheet to obtain very excellent secondary adhesion of an organic film and a method for realizing the layer structure, as a result, the present invention has been accomplished.

That is, the gist of the present invention resides in:

(1) a plated steel sheet for cans, which is a plated steel sheet having a alloy tin layer and a metallic tin layer in sequence from the steel sheet side, wherein a chemical conversion layer comprising tin oxide in an amount of 0.3 to 5.0 mC/cm$^2$ in terms of electricity necessary for reduction and tin phosphate in an amount of 0.5 to 5.0 mg/m$^2$ in terms of P is provided on the metallic tin layer and zirconium(IV) oxide in an amount of 0.2 to 5 mg/m$^2$ in terms of Zr is provided on the chemical conversion layer, (2) the plated steel sheet for cans as claimed in claim 1, wherein the alloy tin layer comprises one or two layers selected from an Fe—Sn alloy layer and an Fe—Ni—Sn alloy layer in an amount of 2 to 100 mg/m$^2$ in terms of Ni, (3) a method for producing a plated steel sheet for cans, comprising subjecting a steel sheet after electrolytic degreasing and pickling to electrolytic tin plating and a heat-melting treatment of tin, applying a cathodic electrolysis treatment and then an anodic electrolysis treatment at 0.2 to 5 A/dm$^2$ for 0.1 to 2 seconds in an aqueous phosphate solution, and further applying a dip or cathodic electrolysis treatment in an acidic aqueous sulfuric acid solution or acidic aqueous nitric acid solution at a pH of 1.5 to 4 containing 0.05 to 5 g/L of zirconium(IV), (4) the method for producing a plated steel sheet for cans as claimed in claim 3, wherein the aqueous phosphate solution is an aqueous solution at a pH of 1.5 to 3 and a liquid temperature of 30 to 50° C. containing one cation or two or more cations selected from sodium ion, potassium ion, calcium ion and magnesium ion, (5) the method for producing a plated steel sheet for cans as claimed in claim 3 or 4, wherein electrolytic Fe—Ni alloy plating or electrolytic Ni plating in an amount of 2 to 100 mg/m$^2$ in terms of Ni is applied before the electro-tin plating, and (6) a can produced using the above-described plated steel sheet for cans.

According to the present invention, a plated steel sheet for cans with very excellent secondary adhesion of an organic film and remarkably high corrosion resistance, and a production method thereof can be provided.

BRIEF DESCRIPTION. OF THE DRAWINGS

FIG. 1 is a transverse cross-sectional view of the plated steel sheet for cans of the present invention.

BEST MODE FOR CARRYING OUT THE INVENTION

The present invention is described in detail below.

The steel sheet for use in the present invention is not particularly limited. A steel sheet having a component system conventionally employed for a steel sheet for cans, such as aluminum-killed steel and low-carbon steel, can be used without any problem. As for the thickness or temper designation of the steel sheet, a grade suitable for the intended purpose may be selected.

In regard to the main construction of the present invention, the plated steel sheet for cans with excellent secondary adhesion of an organic film is a plated steel sheet having a alloy tin layer and a metallic tin layer in sequence from the steel sheet side, wherein a chemical conversion layer comprising tin oxide in an amount of 0.3 to 5.0 mC/cm$^2$ in terms of electricity necessary for reduction and tin phosphate in an amount of 0.5 to 5.0 mg/m$^2$ in terms of P is provided on the metallic tin layer and zirconium(IV) oxide in an amount of 0.2 to 5 mg/m$^2$ in terms of Zr is provided on the chemical conversion layer.

The amount of alloy tin or the amount of metallic tin may be selected to give an appropriate coverage according to the intended purpose and is not limited in the present invention, but in general, the coverage of alloy tin is from 0.1 to 1.6 g/m$^2$ in terms of Sn, and the coverage of metallic tin is from 0.2 to 5 g/m$^2$.

In a tin-plated steel sheet passed through a heat-melting step of tin (reflow treatment) after tin plating, a alloy tin layer at a coverage of 0.1 g/m$^2$ is inevitably produced. If the coverage exceeds 1.6 g/m$^2$, fine cracks are readily produced in the working step such as bending and curling and may work out to an origin point of corrosion and therefore, such a coverage is usually not used.

If the metallic tin coverage is less than 0.2 g/m$^2$, local overheating frequently occurs at the wire seam welding for producing a can barrel and due to many molten metal splashes called dust, a sufficiently wide current range suitable for welding can be hardly obtained, whereas even if the metallic tin coverage exceeds 5 g/m$^2$, only an increase in the gloss of appearance results but advantages in view of performance in use as a can having an organic film are not recognized and therefore, this coverage is usually not used for economical reasons or so as not to waste scarce resources.

The alloy tin layer as the underlying layer of the metallic tin layer may comprise one layer or two or more layers selected from an Fe—Sn alloy layer and an Fe—Ni alloy layer or Fe—Ni—Sn alloy layer in an amount of 2 to 100 mg/m$^2$ in terms of Ni. In particular, an Ni-containing alloy layer works out to a barrier layer at the time of reflowing tin in the layer thereon and advantageously suppresses excess proceeding of Fe—Sn alloying. If the amount of the Fe—Ni alloy layer is less than 2 mg/m$^2$ in terms of Ni, the effect as a barrier for the Fe—Sn alloying reaction is not recognized, whereas if it exceeds 100 mg/m$^2$, the Ni—Sn alloying tends to be accelerated rather than the performance as a barrier for the Fe—Sn alloying is enhanced and this is not preferred.

The underlying layer of the layer comprising zirconium (IV) oxide, which is provided on the metallic tin layer, is a layer comprising tin oxide and tin phosphate. The chemical conversion layer on the metallic tin layer can be confirmed to be a layer allowing for co-presence of tin oxide and tin phosphate by the XPS (X-ray photoelectron spectroscopy) depth profiling. The layer comprising tin oxide and tin phosphate is an intermediate layer for adhering zirconium(IV) oxide to the tin-plated steel sheet. In particular, tin phosphate has excellent bonding force with zirconium(IV) oxide and is considered to play a role of bonding the tin plating layer to tin phosphate. Unless the amounts of tin oxide and tin phosphate in the layer comprising tin oxide and tin phosphate and the amount of zirconium(IV) oxide thereon all are in the ranges of the present invention, the adhesion of an organic film cannot be sufficiently enhanced.

The amount of tin oxide in the layer comprising tin oxide and tin phosphate needs to be from 0.3 to 5.0 mC/cm$^2$ in terms of electricity necessary for reduction. The electricity necessary for the reduction of tin oxide layer can be determined from a potential-time curve obtained by cathodically electrolyzing a tin-plated steel sheet at a constant current of 0.05 mA/cm$^2$ in an aqueous 0.001 mol/L hydrobromic acid solution having removed therefrom the dissolved oxygen by means such as bubbling of a nitrogen gas. In both cases where the electricity necessary for the reduction of tin oxide layer is less than 0.3 mC/cm$^2$ and exceeds 5.0 mC/cm$^2$, the secondary adhesion of an organic film decreases. From the standpoint of securing the secondary adhesion of an organic film, the amount of tin oxide is more preferably from 1.5 to 5.0 mC/cm$^2$, still more preferably from 2.6 to 5.0 mC/cm$^2$. Within this range, a thin tin-plated steel sheet very excellent in the corrosion resistance after painting and the corrosion resistance after lamination can be obtained.

The amount of tin phosphate in the chemical conversion layer comprising tin oxide and tin phosphate needs to be from 0.5 to 5.0 mg/m$^2$ in terms of P. Even if the amount in terms of P is less than 0.5 mg/m$^2$, the primary adhesion of an organic film may be secured, but the secondary adhesion cannot be ensured, whereas if the amount of tin phosphate exceeds 5.0 mg/m$^2$ in terms of P, cohesion failure readily takes place and the primary adhesion and secondary adhesion of an organic film cannot be secured. The amount of tin phosphate is more preferably from 1.4 to 4.8 mg/m$^2$.

The outermost surface of the surface-treated steel sheet of the present invention is a layer containing zirconium(IV) oxide. Zirconium(IV) oxide imparts an effect of enhancing the adhesion of an organic film but on the assumption that the amounts of tin oxide and tin phosphate in the chemical conversion layer are in appropriate ranges, unless the amount of zirconium(IV) oxide is further in an appropriate range, the desired effect cannot be obtained. Zirconium(IV) oxide in the uppermost layer needs to be uniformly distributed, and the amount thereof is from 0.2 to 5 mg/m$^2$ in terms of Zr. If the amount is less than 0.2 mg/m$^2$, this is not enough to cover the surface and the adhesion of an organic film cannot be sufficiently secured, whereas if it exceeds 5 mg/m$^2$, zirconium (IV) oxide readily undergoes cohesion failure and the adhesion rather decreases. The amount is more preferably from 2.0 to 4.7 mg/m$^2$.

The production method of a plated steel sheet for cans with excellent secondary adhesion of an organic film is described in detail below.

The method for plating pretreatment of steel sheet and the tin plating bath used are not particularly specified in the present invention, but when electrolytic alkali degreasing and pickling with dilute sulfuric acid are applied as pretreatments and then electrolytic tin plating is performed in an acidic tin plating bath such as gloss additive-containing phenolsulfonic acid bath or sulfuric acid bath, good tin plating can be obtained. Incidentally, Fe—Ni alloy plating may be applied before tin plating, or the steel sheet may be subjected to nickel plating and then heated to diffuse the nickel in the surface layer of the steel sheet, thereby forming an Fe—Ni alloy layer. The steel sheet after tin plating is dipped in a tank containing water or a diluted tin plating solution, dried and then subjected to a reflow treatment. The reflow treatment is a step of heating the tin-plated steel sheet at a temperature not less than 232° C. which is the melting point of tin, but if the temperature exceeds 300° C., the Fe—Sn alloying is tremendously accelerated and this is not preferred. As for the heating means, electric resistance heating, induction heating or a combination thereof may be used. Immediately after the reflow treatment, a quenching treatment must be performed to prevent excess production of the Fe—Sn alloy layer or Fe—Ni—Sn alloy layer or the surface tin oxide layer. The quenching treatment is performed by dipping the tin-plated steel sheet after melting tin, in water. When the strip is continuously subjected to a reflow treatment and a quenching treatment, the temperature of water in the quenching tank elevates to about 80° C., but this is not a problem because the steel sheet heated in the melting is sufficient if it is cooled to such a degree of temperature.

After the quenching treatment, a chemical conversion treatment is applied by the following method.

In order to obtain a chemical conversion layer comprising tin oxide in an amount of 0.3 to 5.0 $mC/cm^2$ in terms of electricity necessary for reduction and tin phosphate in an amount of 0.5 to 5.0 $mg/m^2$ in terms of P, it is best to apply a cathodic electrolysis treatment in an aqueous phosphate solution and then an anodic electrolysis treatment in the same solution. Good results are obtained when the treating solution is at a pH of 2 to 3. In this pH region, the chemical species of phosphoric acid in the aqueous phosphate solution are mainly phosphoric acid and dihydrogenphosphate ion, and as for the counter cation of the dihydrogenphosphate ion, Na, Sn, Al, Mg and Ca are preferred because of their no effect on the electrolysis treatment. One cation or two or more cations selected from Na, Sn, Al, Mg and Ca may be present. The total concentration of phosphate is suitably from 5 to 80 g/L in terms of phosphoric acid, and the liquid temperature is suitably from 25 to 60° C.

The cathodic electrolysis treatment is a step of reducing tin oxide generated on the tin-plated steel sheet surface in the reflow treatment, which inhibits the adhesion of an organic film. In the cathodic electrolysis treatment, the cathode current density is preferably from 1 to 20 $A/dm^2$, and the electrolysis time is preferably from 0.1 to 2 seconds. If the cathode current density is less than 1 $A/dm^2$, tin oxide produced in the reflow treatment cannot be sufficiently reduced and good adhesion of an organic film can be hardly obtained, whereas even if the cathode current density exceeds 20 $A/dm^2$, this only involves an increase in the amount of hydrogen gas generated on the cathode surface and the adhesion of an organic film is not enhanced. If the electrolysis time is less than 0.1 seconds, tin oxide produced in the reflow treatment cannot be sufficiently reduced and good adhesion of an organic film can be hardly obtained, whereas since tin oxide produced in the reflow treatment is mostly reduced for an electrolysis time of 2 seconds, even if the electrolysis time is more than that, enhancement of the performance such as adhesion of an organic film cannot be recognized.

The anodic electrolysis treatment is a step of producing tin oxide on the metallic tin surface exposed by the reduction in the cathodic electrolysis treatment and slowly dissolving tin to allow its bonding with the phosphate ion in the treating solution, thereby imparting tin phosphate. The tin oxide produced in the anodic electrolysis treatment is considered to differ in the quality from the tin oxide produced in the reflow treatment and does not inhibit the adhesion of an organic film. In the anodic electrolysis treatment, the anode current density is suitably from 0.2 to 5 $A/dm^2$, and the electrolysis time is suitably from 0.1 to 2 seconds. If the anode current density is less than 0.2 $A/dm^2$, the surface tin is insufficiently dissolved, requiring much time until obtaining tin phosphate in an amount large enough to ensure the secondary adhesion of an organic film, and this is not practical, whereas if the anode current density exceeds 5 $A/dm^2$, the surface tin dissolves at an excessively high speed to produce sparse and brittle tin phosphate and due to cohesion failure of this layer, the adhesion of an organic film is seriously deteriorated. If the electrolysis time is less than 0.1 seconds, the P coverage is lacking and good secondary lacquer adhesion and high corrosion resistance cannot be obtained, whereas if the electrolysis time exceeds 2 seconds, the tin oxide layer becomes thick and this gives rise to worsening of primary and secondary lacquer adhesions and corrosion resistance.

After the chemical conversion treatment, the steel sheet is dipped in an acidic aqueous sulfuric or nitric acid solution at a pH of 1.5 to 4 containing from 0.05 to 5 g/L of zirconium (IV) or subjected to a cathodic electrolysis treatment in the acidic aqueous solution. If the zirconium(IV) concentration is less than 0.05 g/L, the Zr coverage is lacking and good secondary lacquer adhesion and high corrosion resistance cannot be obtained, whereas if the zirconium(IV) concentration exceeds 5 g/L, the Zr coverage can be hardly controlled and this makes it impossible to stably obtain the primary and secondary lacquer adhesions and the corrosion resistance. If the pH is less than 1.5, the surface of the tin plating layer or tin phosphate layer is excessively dissolved, whereas if the pH exceeds 4, zirconium(IV) in the solution is readily precipitated as an oxide and this is not preferred. The bath temperature is suitably from 30 to 55° C. and the dipping time is suitably from 0.2 to 2 seconds. When the cathodic electrolysis is performed under the conditions of a current density of 0.5 to 10 $A/dm^2$ and an electrolysis time of 0.2 to 2 seconds, the uniformity of distribution of zirconium oxide in the steel sheet surface direction is increased and a film assured of very excellent secondary adhesion of an organic film can be obtained.

Preferred examples of the zirconium(IV) compound added to the treating bath include $ZrOSO_4 \cdot nH_2O$, $ZrO(NO_3)_2 \cdot nH_2O$, $(NH_4)_2 ZrO(CO_3)_2$, and $ZrO(OH)_2 \cdot nH_2O$.

FIG. 1 shows a transverse cross-section of the plated steel sheet for cans of the present invention. A alloy tin layer 2, a metallic tin layer 3, a chemical conversion layer 4 comprising tin oxide and tin phosphate, and a zirconium oxide layer 5 are provided in sequence on a steel sheet 1.

The method of producing a can for beverage use by using the plated steel sheet for cans of the present invention may be a conventionally known method. An organic film is coated or laminated on the zirconium oxide layer 5 of the plated steel sheet for cans of the present invention and thereafter, a can is produced.

EXAMPLES

The present invention is described in greater detail below by referring to Examples.

A steel strip having a sheet thickness of 0.18 mm and a temper designation of T-5CA obtained by continuously annealing a low-carbon cold-rolled steel strip and then temper rolling the steel was used. As the plating pretreatment, the steel strip was subjected to electrolytic degreasing in a 10 mass % sodium hydroxide solution and then pickling with 5 mass % dilute sulfuric acid.

Fe—Ni alloy plating or Ni plating was applied to some steel strips. The steel strip subjected to Ni plating was then annealed to diffuse Ni and thereby form an Fe—Ni alloy layer.

Thereafter, electrolytic tin plating was applied using a ferrostan bath. In a plating solution at 43° C. containing 20 g/L of tin ion, 75 g/L of phenolsulfonate ion and 5 g/L of a surfactant, cathodic electrolysis was performed at a cathode current density of 20 A/dm$^2$. Platinum-plated titanium was used for the anode. The target amount (coating weight) of tin plating was adjusted by the electrolysis time and set to 1.3 g/m$^2$. After the tin plating, the steel belt was dipped in a solution prepared by 10-fold diluting the tin plating solution, then squeezed by a robber roll to drain the liquid, dried with cold air, heated to 250° C. over 10 seconds by conduction heating to reflow the tin, and immediately quenched with water at 70° C.

Subsequently, the tin-plated steel sheet was subjected to a chemical conversion treatment as follows.

A cathodic electrolysis treatment in a treating solution at a pH of 2.5 and a liquid temperature of 40° C. having a total phosphate concentration of 35 g/L in terms of phosphoric acid and containing 4 g/L of a counter cation and then, an anodic electrolysis treatment in the same solution were performed. For the purpose of comparison, a condition of not applying the above-described chemical conversion treatment was also executed.

After the electrolysis treatment in a phosphate solution, a zirconium treatment was further applied.

The steel strip was dipped in an acidic aqueous sulfuric acid solution at a pH of 1.5 to 4 containing zirconium sulfate $ZrSO_4.4H_2O$ in an amount of 0.05 to 5 g/L in terms of Zr or in an acidic aqueous nitric acid solution at a pH of 1.5 to 4 containing zirconium oxide nitrate (zirconyl nitrate) dihydrate $ZrO(NO_3)_2.2H_2O$ in an amount of 0.05 to 5 g/L in terms of Zr or subjected to a cathodic electrolysis treatment in this solution. The bath temperature was set to 40° C. In either case, the steel strip after treatment was squeezed by a rubber roll to drain the liquid, then swiftly washed with water and dried. For the purpose of comparison, a condition of not applying this treatment was also executed.

The total Sn, P, Ni or Zr coverage was calculated using a calibration curve previously prepared from X-ray fluorescence analysis. The metallic Sn amount in the entire Sn is determined by an electrostripping method using a tin-plated steel sheet as the anode in 1 mol/L dilute hydrochloric acid. Incidentally, from the ratio of Sn, P and O in the micro region determined by AES (Auger electron spectroscopy) and the analysis of the bonded state of Sn, P and O by XPS (X-ray photoelectron spectroscopy), it was confirmed that P was present as tin phosphate.

The amount of tin oxide was determined, in terms of electricity necessary for reduction, from a potential-time curve obtained by performing cathodic electrolysis at a constant current of 0.05 mA/cm$^2$ in an aqueous 0.001 mol/L hydrobromic acid solution deaerated by nitrogen bubbling.

The materials treated above were subjected to evaluation tests of the following items (A) to (D).

(A) Lacquer Primary Adhesion

The material for evaluation was coated with 60 mg/dm$^2$ of an epoxy·phenol-based lacquer and baked at 210° C. for 10 minutes. Furthermore, additional baking was performed at 190° C. for 15 minutes and at 230° C. for 90 seconds. From this painted sheet, a sample in a size of 5 mm×100 mm was cut out. Two sample sheets in the same level were put together by arranging the painted surfaces to face each other, and a 100 µm-thick film-like nylon adhesive was interposed therebetween. This laminate was preheated by a hot press at 200° C. for 60 seconds while leaving gripping margins and then press-bonded at 200° C. for 50 seconds under a pressure of 2.9×10$^5$ Pa to obtain a tensile specimen. The gripping parts each was bent at an angle of 90° C. to create a T-shaped form and pulled in the state of being caught by the chuck of a tensile tester to measure the peel strength, which was used for the evaluation of lacquer primary adhesion. The lacquer primary adhesion was rated AA when the measured strength per 5-mm width of the specimen was 68 N or more, rated BB when from 49 N to less than 68 N, rated CC when from 29 N to less than 49 N, and rated DD when less than 29 N.

(B) Lacquer Secondary Adhesion

The material for evaluation was subjected to painting, baking, and press-bonding with the intervention of a nylon adhesive in the same manner as in (A) above to produce a specimen. This specimen was dipped in a test solution at 55° C. comprising 1.5% citric acid and 1.5% sodium chloride under an open atmosphere for 96 hours, and the gripping parts each was bent at an angle of 90° to create a T-shaped form and pulled in the state of being caught by the chuck of a tensile tester to measure the peel strength, which used for the evaluation of lacquer secondary adhesion. The lacquer secondary adhesion was rated AA when the measured strength per 5-mm width of the specimen was 42 N or more, rated BB when from 34 N to less than 42 N, rated CC when from 25 N to less than 34 N, and rated DD when less than 25 N.

(C) Corrosion Resistance

In order to evaluate the corrosion resistance on the surface of the material for evaluation, the surface corresponding to the inner surface of a can, a UCC (undercutting corrosion) test was performed. The material for evaluation was coated with 50 mg/dm$^2$ of an epoxy·phenol-based lacquer and baked at 205° C. for 10 minutes. Furthermore, additional baking was performed at 180° C. for 10 minutes. From this painted sheet, a sample in a size of 50 mm DD 50 mm was cut out. The coating film was crosscut by a cutter to reach the underlying iron and after sealing the end face and back surface with a lacquer, the sample was dipped in a test solution at 55° C. comprising 1.5% citric acid and 1.5% sodium chloride for 96 hours under an open atmosphere, then washed with water and dried. The scratch parts and planar parts were peeled off with a tape, and the corrosion state in the vicinity of crosscut part, the pitting corrosion of crosscut part, and the removal state of coating film in the planar part were observed, whereby the corrosion resistance was evaluated. The corrosion resistance was rated AA (very good) when neither removal with a tape nor corrosion were observed, rated BB (good) when either one or both of removal with a tape to a length of less than 0.2 mm from the scratch part and slight corrosion unrecognizable with an eye were observed, rated CC (slightly bad) when either one or both of removal with a tape to a length of 0.2 to 0.5 mm from the scratch part and small corrosion recognizable with an eye were observed, and rated DD (bad) when removal with a tape to a length of more than 0.5 mm was generated.

(D) Appearance

The appearance of the material for evaluation directly after the chemical conversion treatment, in terms of overall appearance of gloss, color tone and unevenness, was evaluated with an eye. Those having a very good appearance were rated AA, those having a good appearance causing no problem as a commercial product were rated BB, those having a slightly bad appearance as a commercial product were rated CC, and those inapplicable as a commercial product due to their bad appearance were rated DD.

The comprehensive evaluation based on these performance evaluation results was classified into four levels of AA (very good), BB (good), CC (slightly bad) and DD (bad), and the levels of AA and BB were judged as passed.

The test conditions not described above and the evaluation results are shown in Tables 1 and 2.

TABLE 1

| | | | Conditions of Electrolysis Treatment in Phosphate Solution | | | |
| | | | Cathodic Treatment | | Anodic Treatment | |
| | Underplating | Cation | Current Density | Electrolysis Time | Current Density | Electrolysis Time |
|---|---|---|---|---|---|---|
| Example 1 | none | Na | 5 A/dm$^2$ | 0.3 sec | 1 A/dm$^2$ | 0.3 sec |
| Example 2 | none | Na | 5 A/dm$^2$ | 0.3 sec | 1 A/dm$^2$ | 0.3 sec |
| Example 3 | none | Na | 5 A/dm$^2$ | 0.3 sec | 1 A/dm$^2$ | 0.3 sec |
| Example 4 | none | Na | 5 A/dm$^2$ | 0.3 sec | 1 A/dm$^2$ | 0.3 sec |
| Example 5 | none | Na | 5 A/dm$^2$ | 0.3 sec | 1 A/dm$^2$ | 0.3 sec |
| Example 6 | none | Na | 5 A/dm$^2$ | 0.3 sec | 1 A/dm$^2$ | 0.3 sec |
| Example 7 | none | Na | 5 A/dm$^2$ | 0.3 sec | 1 A/dm$^2$ | 0.3 sec |
| Example 8 | none | Na | 5 A/dm$^2$ | 0.3 sec | 1 A/dm$^2$ | 0.3 sec |
| Example 9 | none | Na | 5 A/dm$^2$ | 0.3 sec | 1 A/dm$^2$ | 0.3 sec |
| Example 10 | none | Na | 5 A/dm$^2$ | 0.3 sec | 0.5 A/dm$^2$ | 0.2 sec |
| Example 11 | none | Na | 5 A/dm$^2$ | 0.3 sec | 1 A/dm$^2$ | 0.5 sec |
| Example 12 | none | Na | 5 A/dm$^2$ | 0.3 sec | 3 A/dm$^2$ | 1.0 sec |
| Example 13 | none | Sn | 5 A/dm$^2$ | 0.3 sec | 1 A/dm$^2$ | 0.3 sec |
| Example 14 | none | Al | 5 A/dm$^2$ | 0.3 sec | 1 A/dm$^2$ | 0.3 sec |
| Example 15 | none | Mg | 5 A/dm$^2$ | 0.3 sec | 1 A/dm$^2$ | 0.3 sec |
| Example 16 | none | Ca | 5 A/dm$^2$ | 0.3 sec | 1 A/dm$^2$ | 0.3 sec |
| Example 17 | none | Na | 5 A/dm$^2$ | 0.3 sec | 1 A/dm$^2$ | 0.3 sec |
| Example 18 | none | Na | 5 A/dm$^2$ | 0.3 sec | 1 A/dm$^2$ | 0.3 sec |
| Example 19 | none | Na | 5 A/dm$^2$ | 0.3 sec | 1 A/dm$^2$ | 0.3 sec |
| Example 20 | none | Na | 5 A/dm$^2$ | 0.3 sec | 1 A/dm$^2$ | 0.3 sec |
| Example 21 | none | Na | 5 A/dm$^2$ | 0.3 sec | 1 A/dm$^2$ | 0.3 sec |
| Example 22 | none | Na | 5 A/dm$^2$ | 0.3 sec | 1 A/dm$^2$ | 0.3 sec |
| Example 23 | none | Na | 5 A/dm$^2$ | 0.3 sec | 1 A/dm$^2$ | 0.3 sec |
| Example 24 | none | Na | 5 A/dm$^2$ | 0.3 sec | 1 A/dm$^2$ | 0.3 sec |
| Example 25 | none | Na | 5 A/dm$^2$ | 0.3 sec | 1 A/dm$^2$ | 0.3 sec |
| Example 26 | none | Na | 5 A/dm$^2$ | 0.3 sec | 1 A/dm$^2$ | 0.3 sec |
| Example 27 | none | Na | 5 A/dm$^2$ | 0.3 sec | 1 A/dm$^2$ | 0.3 sec |
| Example 28 | none | Sn | 5 A/dm$^2$ | 0.3 sec | 1 A/dm$^2$ | 0.3 sec |
| Example 29 | none | Al | 5 A/dm$^2$ | 0.3 sec | 1 A/dm$^2$ | 0.3 sec |
| Example 30 | none | Mg | 5 A/dm$^2$ | 0.3 sec | 1 A/dm$^2$ | 0.3 sec |
| Example 31 | none | Ca | 5 A/dm$^2$ | 0.3 sec | 1 A/dm$^2$ | 0.3 sec |
| Example 32 | none | Na | 5 A/dm$^2$ | 0.3 sec | 1 A/dm$^2$ | 0.3 sec |
| Example 33 | none | Na | 5 A/dm$^2$ | 0.3 sec | 1 A/dm$^2$ | 0.3 sec |
| Example 34 | none | Na | 5 A/dm$^2$ | 0.3 sec | 1 A/dm$^2$ | 0.3 sec |
| Example 35 | none | Na | 5 A/dm$^2$ | 0.3 sec | 1 A/dm$^2$ | 0.3 sec |
| Example 36 | none | Na | 5 A/dm$^2$ | 0.3 sec | 1 A/dm$^2$ | 0.3 sec |
| Example 37 | none | Na | 5 A/dm$^2$ | 0.3 sec | 1 A/dm$^2$ | 0.3 sec |
| Example 38 | none | Na | 5 A/dm$^2$ | 0.3 sec | 1 A/dm$^2$ | 0.3 sec |
| Example 39 | none | Na | 5 A/dm$^2$ | 0.3 sec | 1 A/dm$^2$ | 0.3 sec |
| Example 40 | none | Na | 5 A/dm$^2$ | 0.3 sec | 1 A/dm$^2$ | 0.3 sec |
| Example 41 | none | Na | 5 A/dm$^2$ | 0.3 sec | 1 A/dm$^2$ | 0.3 sec |
| Example 42 | Ni | Na | 5 A/dm$^2$ | 0.3 sec | 1 A/dm$^2$ | 0.3 sec |
| Example 43 | Fe—Ni | Na | 5 A/dm$^2$ | 0.3 sec | 1 A/dm$^2$ | 0.3 sec |
| Example 44 | Ni | Na | 5 A/dm$^2$ | 0.3 sec | 1 A/dm$^2$ | 0.3 sec |
| Example 45 | Fe—Ni | Na | 5 A/dm$^2$ | 0.3 sec | 1 A/dm$^2$ | 0.3 sec |
| Example 46 | none | Na | 1.2 A/dm$^2$ | 0.3 sec | 1 A/dm$^2$ | 0.3 sec |
| Example 47 | none | Na | 19 A/dm$^2$ | 0.3 sec | 1 A/dm$^2$ | 0.3 sec |
| Example 48 | none | Na | 5 A/dm$^2$ | 0.12 sec | 1 A/dm$^2$ | 0.3 sec |
| Example 49 | none | Na | 5 A/dm$^2$ | 1.8 sec | 1 A/dm$^2$ | 0.3 sec |

| | Zirconium Treatment | | | | | | | | |
| | Zr(IV) | | | | | Coating Weight | | | |
| | Acid | Concentration, g/L | pH | Treating Method | Ni mg/m$^2$ | Free Sn g/m$^2$ | Alloy Sn g/m$^2$ | P mg/m$^2$ | Zr mg/m$^2$ |
|---|---|---|---|---|---|---|---|---|---|
| Example 1 | nitric acid | 0.1 | 2.5 | electrolysis of 5 A/dm$^2$ × 0.4 sec | 0 | 0.35 | 0.95 | 0.6 | 0.3 |
| Example 2 | nitric acid | 1.8 | 2.5 | electrolysis of 5 A/dm$^2$ × 0.4 sec | 0 | 0.35 | 0.94 | 0.6 | 2.0 |
| Example 3 | nitric acid | 4.5 | 2.5 | electrolysis of 5 A/dm$^2$ × 0.4 sec | 0 | 0.35 | 0.94 | 0.6 | 4.7 |
| Example 4 | nitric acid | 0.1 | 2.5 | electrolysis of 5 A/dm$^2$ × 0.4 sec | 0 | 0.35 | 0.95 | 1.4 | 0.3 |
| Example 5 | nitric acid | 1.8 | 2.5 | electrolysis of 5 A/dm$^2$ × 0.4 sec | 0 | 0.34 | 0.95 | 1.4 | 2.0 |
| Example 6 | nitric acid | 4.5 | 2.5 | electrolysis of 5 A/dm$^2$ × 0.4 sec | 0 | 0.34 | 0.95 | 1.4 | 4.7 |
| Example 7 | nitric acid | 0.1 | 2.5 | electrolysis of 5 A/dm$^2$ × 0.4 sec | 0 | 0.35 | 0.94 | 4.8 | 0.3 |
| Example 8 | nitric acid | 1.8 | 2.5 | electrolysis of 5 A/dm$^2$ × 0.4 sec | 0 | 0.34 | 0.95 | 4.8 | 2.0 |
| Example 9 | nitric acid | 4.5 | 2.5 | electrolysis of 5 A/dm$^2$ × 0.4 sec | 0 | 0.35 | 0.94 | 4.8 | 4.7 |
| Example 10 | nitric acid | 1.8 | 2.5 | electrolysis of 5 A/dm$^2$ × 0.4 sec | 0 | 0.35 | 0.94 | 1.4 | 2.0 |
| Example 11 | nitric acid | 1.8 | 2.5 | electrolysis of 5 A/dm$^2$ × 0.4 sec | 0 | 0.35 | 0.94 | 1.4 | 2.0 |
| Example 12 | nitric acid | 1.8 | 2.5 | electrolysis of 5 A/dm$^2$ × 0.4 sec | 0 | 0.35 | 0.95 | 1.4 | 2.0 |
| Example 13 | nitric acid | 1.8 | 2.5 | electrolysis of 5 A/dm$^2$ × 0.4 sec | 0 | 0.35 | 0.94 | 1.4 | 2.0 |

TABLE 1-continued

| | | | | | | | | | |
|---|---|---|---|---|---|---|---|---|---|
| Example 14 | nitric acid | 1.8 | 2.5 electrolysis of 5 A/dm² × 0.4 sec | 0 | 0.35 | 0.94 | 1.4 | 2.0 |
| Example 15 | nitric acid | 1.8 | 2.5 electrolysis of 5 A/dm² × 0.4 sec | 0 | 0.35 | 0.94 | 1.4 | 2.0 |
| Example 16 | nitric acid | 1.8 | 2.5 electrolysis of 5 A/dm² × 0.4 sec | 0 | 0.35 | 0.94 | 1.4 | 2.0 |
| Example 17 | nitric acid | 1.8 | 1.8 electrolysis of 5 A/dm² × 0.4 sec | 0 | 0.35 | 0.94 | 1.4 | 1.8 |
| Example 18 | nitric acid | 1.8 | 3.7 electrolysis of 5 A/dm² × 0.4 sec | 0 | 0.35 | 0.94 | 1.4 | 2.2 |
| Example 19 | nitric acid | 0.1 | 2.5 0.7 sec dipping | 0 | 0.35 | 0.95 | 0.6 | 0.3 |
| Example 20 | nitric acid | 1.8 | 2.5 0.7 sec dipping | 0 | 0.35 | 0.94 | 0.6 | 2.0 |
| Example 21 | nitric acid | 4.5 | 2.5 0.7 sec dipping | 0 | 0.35 | 0.94 | 0.6 | 4.7 |
| Example 22 | nitric acid | 0.1 | 2.5 0.7 sec dipping | 0 | 0.35 | 0.95 | 1.4 | 0.3 |
| Example 23 | nitric acid | 1.8 | 2.5 0.7 sec dipping | 0 | 0.34 | 0.95 | 1.4 | 2.0 |
| Example 24 | nitric acid | 4.5 | 2.5 0.7 sec dipping | 0 | 0.34 | 0.95 | 1.4 | 4.7 |
| Example 25 | nitric acid | 0.1 | 2.5 0.7 sec dipping | 0 | 0.35 | 0.94 | 4.8 | 0.3 |
| Example 26 | nitric acid | 1.8 | 2.5 0.7 sec dipping | 0 | 0.34 | 0.95 | 4.8 | 2.0 |
| Example 27 | nitric acid | 4.5 | 2.5 0.7 sec dipping | 0 | 0.35 | 0.94 | 4.8 | 4.7 |
| Example 28 | nitric acid | 1.8 | 2.5 0.7 sec dipping | 0 | 0.35 | 0.94 | 1.4 | 2.0 |
| Example 29 | nitric acid | 1.8 | 2.5 0.7 sec dipping | 0 | 0.35 | 0.94 | 1.4 | 2.0 |
| Example 30 | nitric acid | 1.8 | 2.5 0.7 sec dipping | 0 | 0.35 | 0.95 | 1.4 | 2.0 |
| Example 31 | nitric acid | 1.8 | 2.5 0.7 sec dipping | 0 | 0.34 | 0.94 | 1.4 | 2.0 |
| Example 32 | nitric acid | 1.8 | 1.8 0.7 sec dipping | 0 | 0.35 | 0.94 | 1.4 | 1.8 |
| Example 33 | nitric acid | 1.8 | 3.7 0.7 sec dipping | 0 | 0.35 | 0.94 | 1.4 | 2.2 |
| Example 34 | nitric acid | 1.8 | 2.5 0.3 sec dipping | 0 | 0.35 | 0.94 | 1.4 | 1.7 |
| Example 35 | nitric acid | 1.8 | 2.5 1.9 sec dipping | 0 | 0.35 | 0.94 | 1.4 | 2.7 |
| Example 36 | nitric acid | 1.8 | 2.5 electrolysis of 0.6 A/dm² × 0.4 sec | 0 | 0.35 | 0.94 | 1.4 | 2.0 |
| Example 37 | nitric acid | 1.8 | 2.5 electrolysis of 9 A/dm² × 0.4 sec | 0 | 0.35 | 0.94 | 1.4 | 2.0 |
| Example 38 | nitric acid | 1.8 | 2.5 electrolysis of 5 A/dm² × 0.25 sec | 0 | 0.35 | 0.95 | 1.4 | 2.0 |
| Example 39 | nitric acid | 1.8 | 2.5 electrolysis of 5 A/dm² × 1.9 sec | 0 | 0.34 | 0.94 | 1.4 | 2.0 |
| Example 40 | nitric acid | 1.8 | 2.5 electrolysis of 5 A/dm² × 0.4 sec | 0 | 0.35 | 0.94 | 1.4 | 2.0 |
| Example 41 | nitric acid | 1.8 | 2.5 0.7 sec dipping | 0 | 0.35 | 0.94 | 1.4 | 2.0 |
| Example 42 | nitric acid | 1.8 | 2.5 electrolysis of 5 A/dm² × 0.4 sec | 80 | 0.34 | 0.95 | 1.4 | 2.0 |
| Example 43 | nitric acid | 1.8 | 2.5 electrolysis of 5 A/dm² × 0.4 sec | 5 | 0.35 | 0.94 | 1.4 | 2.0 |
| Example 44 | nitric acid | 1.8 | 2.5 0.7 sec dipping | 80 | 0.35 | 0.94 | 1.4 | 2.0 |
| Example 45 | nitric acid | 1.8 | 2.5 0.7 sec dipping | 5 | 0.35 | 0.95 | 1.4 | 2.0 |
| Example 46 | nitric acid | 1.8 | 2.5 0.7 sec dipping | 0 | 0.35 | 0.94 | 1.4 | 2.0 |
| Example 47 | nitric acid | 1.8 | 2.5 0.7 sec dipping | 0 | 0.34 | 0.94 | 1.4 | 2.0 |
| Example 48 | nitric acid | 1.8 | 2.5 0.7 sec dipping | 0 | 0.35 | 0.95 | 1.4 | 2.0 |
| Example 49 | nitric acid | 1.8 | 2.5 0.7 sec dipping | 0 | 0.35 | 0.94 | 1.4 | 2.0 |

| | Tin Oxide mC/cm² | (A) Dry Lacquer Adhesion | (B) Secondary Lacquer Adhesion | (C) Corrosion Resistance | (D) Appearance | Comprehensive Evaluation |
|---|---|---|---|---|---|---|
| Example 1 | 1.5 | AA | BB | AA | AA | AA-BB |
| Example 2 | 1.5 | AA | AA | AA | AA | AA |
| Example 3 | 1.5 | AA | AA | AA | BB | AA-BB |
| Example 4 | 1.5 | AA | AA | AA | AA | AA |
| Example 5 | 1.5 | AA | AA | AA | AA | AA |
| Example 6 | 1.5 | AA | AA | AA | BB | AA |
| Example 7 | 1.5 | AA | AA | AA | AA | AA |
| Example 8 | 1.5 | AA | BB | AA | AA | AA-BB |
| Example 9 | 1.5 | AA | BB | AA | AA | AA-BB |
| Example 10 | 0.4 | AA | BB | AA | AA | AA-BB |
| Example 11 | 2.7 | AA | AA | AA | AA | AA |
| Example 12 | 4.8 | AA | BB | AA | AA | AA-BB |
| Example 13 | 1.5 | AA | AA | AA | AA | AA |
| Example 14 | 1.5 | AA | AA | AA | AA | AA |
| Example 15 | 1.5 | AA | AA | AA | AA | AA |
| Example 16 | 1.5 | AA | AA | AA | AA | AA |
| Example 17 | 1.5 | AA | AA | AA | AA | AA |
| Example 18 | 1.5 | AA | AA | AA | AA | AA |
| Example 19 | 1.5 | AA | BB | AA | AA | AA-BB |
| Example 20 | 1.5 | AA | AA | AA | AA | AA |
| Example 21 | 1.5 | AA | AA | AA | BB | AA-BB |
| Example 22 | 1.5 | AA | BB | AA | AA | AA-BB |
| Example 23 | 1.5 | AA | AA | AA | AA | AA |
| Example 24 | 1.5 | AA | AA | AA | BB | AA-BB |
| Example 25 | 1.5 | AA | BB | AA | AA | AA-BB |
| Example 26 | 1.5 | AA | BB | AA | AA | AA-BB |
| Example 27 | 1.5 | AA | BB | AA | BB | BB |
| Example 28 | 1.5 | AA | AA | AA | AA | AA |
| Example 29 | 1.5 | AA | AA | AA | AA | AA |
| Example 30 | 1.5 | AA | AA | AA | AA | AA |
| Example 31 | 1.5 | AA | AA | AA | AA | AA |
| Example 32 | 1.5 | AA | AA | AA | AA | AA |
| Example 33 | 1.5 | AA | AA | AA | AA | AA |
| Example 34 | 1.5 | AA | AA | AA | AA | AA |
| Example 35 | 1.5 | AA | AA | AA | AA | AA |
| Example 36 | 1.5 | AA | AA | AA | AA | AA |
| Example 37 | 1.5 | AA | AA | AA | AA | AA |
| Example 38 | 1.5 | AA | AA | AA | AA | AA |
| Example 39 | 1.5 | AA | AA | AA | AA | AA |

TABLE 1-continued

| | | | | | | |
|---|---|---|---|---|---|---|
| Example 40 | 1.5 | AA | AA | AA | AA | AA |
| Example 41 | 1.5 | AA | AA | AA | AA | AA |
| Example 42 | 1.5 | AA | AA | AA | AA | AA |
| Example 43 | 1.5 | AA | AA | AA | AA | AA |
| Example 44 | 1.5 | AA | AA | AA | AA | AA |
| Example 45 | 1.5 | AA | AA | AA | AA | AA |
| Example 46 | 1.5 | AA | BB | AA | AA | BB |
| Example 47 | 1.5 | AA | AA | AA | AA | AA |
| Example 48 | 1.5 | AA | BB | AA | AA | BB |
| Example 49 | 1.5 | AA | AA | AA | AA | AA |

AA: Very good, BB: good, CC: slightly bad, DD: bad.

TABLE 2

| | | | Conditions of Electrolysis Treatment in Phosphate Solution | | | |
|---|---|---|---|---|---|---|
| | | | Cathodic Treatment | | Anodic Treatment | |
| | Underplating | Cation | Current Density | Electrolysis Time | Current Density | Electrolysis Time |
| Comparative Example 1 | none | Na | 5 A/dm$^2$ | 0.3 sec | 0.1 A/dm$^2$ | 0.3 sec |
| Comparative Example 2 | none | Na | 5 A/dm$^2$ | 0.3 sec | 10 A/dm$^2$ | 0.3 sec |
| Comparative Example 3 | none | Na | 5 A/dm$^2$ | 0.3 sec | 1 A/dm$^2$ | 0.03 sec |
| Comparative Example 4 | none | Na | 5 A/dm$^2$ | 0.3 sec | 1 A/dm$^2$ | 4.0 sec |
| Comparative Example 5 | none | none | none | none | none | none |
| Comparative Example 6 | none | Na | 5 A/dm$^2$ | 0.3 sec | none | none |
| Comparative Example 7 | none | Na | 5 A/dm$^2$ | 0.3 sec | 1 A/dm$^2$ | 0.3 sec |
| Comparative Example 8 | none | Na | 5 A/dm$^2$ | 0.3 sec | 1 A/dm$^2$ | 0.3 sec |
| Comparative Example 9 | none | Na | 5 A/dm$^2$ | 0.3 sec | 1 A/dm$^2$ | 0.3 sec |
| Comparative Example 10 | none | Na | 5 A/dm$^2$ | 0.3 sec | 1 A/dm$^2$ | 0.3 sec |
| Comparative Example 11 | none | Na | 5 A/dm$^2$ | 0.3 sec | 1 A/dm$^2$ | 0.3 sec |

| | Zirconium Treatment | | | Coating Weight | | | | |
|---|---|---|---|---|---|---|---|---|
| | | Zr(IV) | | | | | | |
| | Acid | Concentration, g/L | pH | Treating Method | Ni mg/m$^2$ | Free Sn g/m$^2$ | Alloy Sn g/m$^2$ | P mg/m$^2$ | Zr mg/m$^2$ |
| Comparative Example 1 | nitric acid | 1.8 | 2.5 | electrolysis of 5 A/dm$^2$ × 0.4 sec | 0 | 0.35 | 0.94 | 0.3 | 2.0 |
| Comparative Example 2 | nitric acid | 1.8 | 2.5 | 0.7 sec dipping | 0 | 0.35 | 0.94 | 7.2 | 2.0 |
| Comparative Example 3 | nitric acid | 1.8 | 2.5 | electrolysis of 5 A/dm$^2$ × 0.4 sec | 0 | 0.35 | 0.94 | 0.3 | 2.0 |
| Comparative Example 4 | nitric acid | 1.8 | 2.5 | 0.7 sec dipping | 0 | 0.35 | 0.94 | 0.6 | 2.0 |
| Comparative Example 5 | nitric acid | 1.8 | 2.5 | electrolysis of 5 A/dm$^2$ × 0.4 sec | 0 | 0.35 | 0.94 | 0 | 2.0 |
| Comparative Example 6 | nitric acid | 1.8 | 2.5 | 0.7 sec dipping | 0 | 0.35 | 0.94 | 0.1 | 2.0 |
| Comparative Example 7 | none | none | — | none | 0 | 0.35 | 0.94 | 0.6 | 0.0 |
| Comparative Example 8 | nitric acid | 0.03 | 2.5 | electrolysis of 5 A/dm$^2$ × 0.4 sec | 0 | 0.35 | 0.94 | 0.6 | 0.1 |
| Comparative Example 9 | nitric acid | 8 | 2.5 | 0.7 sec dipping | 0 | 0.35 | 0.94 | 0.6 | 7.0 |
| Comparative Example 10 | nitric acid | 1.8 | 1 | electrolysis of 5 A/dm$^2$ × 0.4 sec | 0 | 0.31 | 0.94 | 0.3 | 0.2 |
| Comparative Example 11 | nitric acid | 1.8 | 5 | 0.7 sec dipping | 0 | 0.35 | 0.94 | 0.6 | 0.2 |

TABLE 2-continued

|  | Tin Oxide mC/cm$^2$ | (A) Dry Lacquer Adhesion | (B) Secondary Lacquer Adhesion | (C) Corrosion Resistance | (D) Appearance | Comprehensive Evaluation |
| --- | --- | --- | --- | --- | --- | --- |
| Comparative Example 1 | 1.5 | AA | CC | CC | AA | CC |
| Comparative Example 2 | 1.5 | DD | DD | DD | DD | DD |
| Comparative Example 3 | 1.5 | AA | CC | CC | AA | CC |
| Comparative Example 4 | 7.0 | BB | DD | DD | CC | DD |
| Comparative Example 5 | 7.0 | CC | DD | DD | AA | DD |
| Comparative Example 6 | 0.1 | BB | CC | CC | AA | CC |
| Comparative Example 7 | 1.5 | CC | DD | DD | AA | DD |
| Comparative Example 8 | 1.5 | BB | CC | CC | AA | CC |
| Comparative Example 9 | 1.5 | CC | DD | DD | BB | DD |
| Comparative Example 10 | 0.8 | CC | DD | DD | CC | DD |
| Comparative Example 11 | 1.5 | BB | DD | DD | AA | DD |

AA: Very good, BB: good, CC: slightly bad, DD: bad.

In Examples 1 to 49 of the present invention, all evaluation items and the comprehensive evaluation were in the level of AA or BB, and the required performances were satisfied.

In Comparative Example 1 where a cathodic electrolysis treatment and an anodic electrolysis treatment were applied in a phosphate solution and a zirconium treatment was further applied, the P coverage was lacking due to the low current density at the anodic electrolysis treatment and satisfactory performance in terms of secondary lacquer adhesion and corrosion resistance could not be obtained.

In Comparative Example 2 where a cathodic electrolysis treatment and an anodic electrolysis treatment were applied in a phosphate solution and a zirconium treatment was further applied, tin phosphate produced was brittle due to excessively high current density at the anodic electrolysis treatment, the lacquer adhesion was poor in both primary and secondary adhesions due to excessive P coverage, and the corrosion resistance was bad. Also, since the current density at the anodic electrolysis treatment was high, tin was partially dissolved and bad appearance resulted.

In Comparative Example 3 where a cathodic electrolysis treatment and an anodic electrolysis treatment were applied in a phosphate solution and a zirconium treatment was further applied, the P coverage was lacking due to short anodic electrolysis time and satisfactory performance in terms of secondary lacquer adhesion and corrosion resistance could not be obtained.

In Comparative Example 4 where a cathodic electrolysis treatment and an anodic electrolysis treatment were applied in a phosphate solution and a zirconium treatment was further applied, the tin oxide layer became thick due to long anodic electrolysis time and the performance in terms of primary and secondary lacquer adhesions and corrosion resistance was poor.

In Comparative Example 5 where treatments with a phosphate solution were not applied, tin oxide produced by the reflow treatment was remaining in a large thickness and because of this, the lacquer adhesion was poor in both primary and secondary adhesions. The corrosion resistance was also bad.

In Comparative Example 6 where no anodic electrolysis treatment but only a cathodic electrolysis treatment was applied in a phosphate solution and a zirconium treatment was applied, the P coverage and tin oxide amount were lacking and satisfactory performance in terms of secondary lacquer adhesion and corrosion resistance could not be obtained.

In Comparative Example 7 where a cathodic electrolysis treatment and an anodic electrolysis treatment were applied in a phosphate solution but a zirconium treatment was not applied, the performance in terms of primary and secondary lacquer adhesions and corrosion resistance was poor due to no adhesion of Zr.

In Comparative Example 8 where a cathodic electrolysis treatment and an anodic electrolysis treatment were applied in a phosphate solution and a zirconium treatment was further applied, the Zr coverage was lacking due to low Zr(IV) concentration and the performance in terms of secondary lacquer adhesion and corrosion resistance was poor.

In Comparative Example 9 where a cathodic electrolysis treatment and an anodic electrolysis treatment were applied in a phosphate solution and a zirconium treatment was further applied, the Zr coverage was excessive due to too high Zr(IV) concentration and the performance in terms of primary and secondary lacquer adhesions and corrosion resistance was poor.

In Comparative Example 10 where a cathodic electrolysis treatment and an anodic electrolysis treatment were applied in a phosphate solution and a zirconium treatment was further applied, tin or P on the surface was partially dissolved due to low pH of the zirconium treating solution and Zr could hardly adhere. The appearance was bad and the performance in terms of primary and secondary lacquer adhesions and corrosion resistance was poor.

In Comparative Example 11 where a cathodic electrolysis treatment and an anodic electrolysis treatment were applied in a phosphate solution and a zirconium treatment was further applied, the pH of the zirconium treating solution was high and a hydroxide of Zr was precipitated in the treating solution, as a result, the Zr(IV) concentration in the treating solution was lowered and the Zr coverage was lacking, giving rise to poor performance in terms of secondary lacquer adhesion and corrosion resistance.

INDUSTRIAL APPLICABILITY

According to the present invention, a plated steel sheet for cans with very excellent secondary adhesion of an organic film and remarkably high corrosion resistance, and a production method thereof are provided. Industrial applicability of the present invention is obvious.

The invention claimed is:

1. A plated steel sheet for cans, the plated steel sheet comprising:
   a steel sheet plated with, in sequence from the steel sheet;
   an alloy tin layer;
   a metallic tin layer;
   a chemical conversion layer; and
   a zirconium oxide layer;
   wherein
   the chemical conversion layer on the metallic tin layer comprises tin oxide and tin phosphate, wherein the tin oxide is present in an amount requiring 0.3 to 5.0 $mC/cm^2$ of electricity to reduce the tin oxide, and the tin phosphate is present in an amount corresponding to 0.5 to 5.0 $mg/m^2$ of P;
   the alloy tin layer is present in an amount corresponding to 0.1 to 1.6 $g/m^2$ of Sn;
   the metallic tin layer is present in an amount of 0.2 to 5 $g/m^2$; and
   the zirconium oxide layer on the chemical conversion layer comprises zirconium(IV) oxide, wherein the zirconium oxide is present in an amount corresponding to 0.2 to 5 $mg/m^2$ of Zr.

2. The plated steel sheet for cans as claimed in claim 1, wherein the alloy tin layer comprises one or two layers selected from the group consisting of an Fe—Sn alloy layer and an Fe—Ni—Sn alloy layer, wherein in the Fe—Ni—Sn alloy layer Ni is present in an amount of 2 to 100 $mg/m^2$.

3. The plated steel sheet for cans as claimed in claim 1, wherein the tin oxide is present in the chemical conversion layer in an amount requiring 1.5 to 5.0 $mC/cm^2$ of electricity to reduce the tin oxide.

4. The plated steel sheet for cans as claimed in claim 1, wherein the tin phosphate is present in the chemical conversion layer in an amount corresponding to 1.4 to 4.8 $mg/m^2$ of P.

5. The plated steel sheet for cans as claimed in claim 1, wherein zirconium(IV) oxide is present in the chemical conversion layer in an amount corresponding to 2.0 to 4.7 $mg/m^2$ of Zr.

6. A can produced from a plated steel sheet, the plated steel sheet comprising:
   a steel sheet plated with, in sequence from the steel sheet;
   an alloy tin layer;
   a metallic tin layer;
   a chemical conversion layer; and
   a zirconium oxide layer;
   wherein
   the chemical conversion layer on the metallic tin layer comprises tin oxide and tin phosphate, wherein the tin oxide is present in an amount requiring 0.3 to 5.0 $mC/cm^2$ of electricity to reduce the tin oxide, and the tin phosphate is present in an amount corresponding to 0.5 to 5.0 $mg/m^2$ of P;
   the alloy tin layer is present in an amount corresponding to 0.1 to 1.6 $g/m^2$ of Sn;
   the metallic tin layer is present in an amount of 0.2 to 5 $g/m^2$; and
   the zirconium oxide layer on the chemical conversion layer comprises zirconium(IV) oxide, wherein the zirconium oxide is present in an amount corresponding to 0.2 to 5 $mg/m^2$ of Zr.

7. The can as claimed in claim 6, wherein the alloy tin layer comprises one or two layers selected from the group consisting of an Fe—Sn alloy layer and an Fe—Ni—Sn alloy layer, wherein in the Fe—Ni—Sn alloy layer Ni is present in an amount of 2 to 100 $mg/m^2$.

8. The plated steel sheet for cans as claimed in claim 6, wherein the tin oxide is present in the chemical conversion layer in an amount requiring 1.5 to 5.0 $mC/cm^2$ of electricity to reduce the tin oxide.

9. The plated steel sheet for cans as claimed in claim 6, wherein the tin phosphate is present in the chemical conversion layer in an amount corresponding to 1.4 to 4.8 $mg/m^2$ of P.

10. The plated steel sheet for cans as claimed in claim 6, wherein zirconium(IV) oxide is present in the chemical conversion layer in an amount corresponding to 2.0 to 4.7 $mg/m^2$ of Zr.

* * * * *

UNITED STATES PATENT AND TRADEMARK OFFICE
CERTIFICATE OF CORRECTION

PATENT NO. : 8,679,643 B2  
APPLICATION NO. : 12/450645  
DATED : March 25, 2014  
INVENTOR(S) : Hiromitsu Date Page 1 of 1

It is certified that error appears in the above-identified patent and that said Letters Patent is hereby corrected as shown below:

On the Title Page

Item (57) Abstract, line 4, change "having a alloy" to -- having an alloy --;

In the Specification

Column 2, line 24, change "a alloy" to -- an alloy --;

Column 3, line 14, change "a alloy" to -- an alloy --;

Column 3, line 29, change "a alloy" to -- an alloy --;

Column 3, line 49, change "an Ni-containing" to -- a Ni-containing --; and

Column 6, line 42, change "A alloy" to -- An alloy --.

Signed and Sealed this  
Second Day of September, 2014

Michelle K. Lee  
*Deputy Director of the United States Patent and Trademark Office*

UNITED STATES PATENT AND TRADEMARK OFFICE
CERTIFICATE OF CORRECTION

PATENT NO.       : 8,679,643 B2                                              Page 1 of 1
APPLICATION NO. : 12/450645
DATED            : March 25, 2014
INVENTOR(S)      : Hiromitsu Date It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 771 days.

Signed and Sealed this

Twenty-ninth Day of September, 2015

Michelle K. Lee
*Director of the United States Patent and Trademark Office*